(12) United States Patent
Häckel et al.

(10) Patent No.: US 10,012,336 B2
(45) Date of Patent: Jul. 3, 2018

(54) CONNECTOR ASSEMBLY WITH AT LEAST ONE CONNECTOR AND AT LEAST ONE MEDIA LINE

(71) Applicant: Ti Automotive (Fuldabrück) GmbH, Fuldabrück (DE)

(72) Inventors: Andre Häckel, Waldeck (DE); Gerd Fischbach, Borken (DE); Iris Barthel, Schauenburg (DE); Kay Bube, Schenklengsfeld (DE); Michael Weissing, Heidelberg (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 0 days.

(21) Appl. No.: 15/439,095

(22) Filed: Feb. 22, 2017

(65) Prior Publication Data

US 2017/0241582 A1    Aug. 24, 2017

(30) Foreign Application Priority Data

Feb. 23, 2016    (EP) .................................... 16157018

(51) Int. Cl.
*F16L 53/00*    (2018.01)
*F16L 53/35*    (2018.01)
(Continued)

(52) U.S. Cl.
CPC .......... *F16L 53/008* (2013.01); *F01N 3/2066* (2013.01); *F01N 13/18* (2013.01);
(Continued)

(58) Field of Classification Search
CPC ....... F16L 53/00; F16L 53/001; F16L 53/004; F16L 53/005; F16L 53/007; F16L 53/008
See application file for complete search history.

(56) References Cited

U.S. PATENT DOCUMENTS

| 5,366,255 A | * | 11/1994 | Garkawe ................. F16L 51/00 |
| | | | 285/299 |
| 9,651,185 B2 | * | 5/2017 | Borgmeier ............ F16L 53/008 |

(Continued)

FOREIGN PATENT DOCUMENTS

| DE | 102006060314 A1 | 6/2008 |
| DE | 112008003310 T5 | 11/2010 |

(Continued)

OTHER PUBLICATIONS

European Search Report for EP 16157018.9 dated Aug. 16, 2016.

*Primary Examiner* — Aaron M Dunwoody
(74) *Attorney, Agent, or Firm* — Brinks Gilson & Lione

(57) ABSTRACT

Connector assembly, and/or motor-vehicle connector assembly, with at least one connector and at least one media line connected to the connector. The media line is electrically heated, a heat-conducting element being arranged in the transition region between connector and media line. The heat-conducting element extends with a first heat-conducting section into the media line and with a second heat-conducting section into the connector. By means of the electric heating of the media line, the heat-conducting element is heated, and/or indirectly heated, and in particular is heated and/or indirectly heated as far as the region of the connector.

18 Claims, 2 Drawing Sheets

(51) Int. Cl.
*F01N 3/20* (2006.01)
*F01N 13/18* (2010.01)
*H05B 3/06* (2006.01)
*H05B 3/58* (2006.01)
*H05B 3/04* (2006.01)
*F16L 53/38* (2018.01)

(52) U.S. Cl.
CPC ............... *F16L 53/35* (2018.01); *F16L 53/38* (2018.01); *H05B 3/04* (2013.01); *H05B 3/06* (2013.01); *H05B 3/58* (2013.01); *F01N 2450/18* (2013.01); *F01N 2470/24* (2013.01); *F01N 2610/02* (2013.01); *F01N 2610/10* (2013.01); *F01N 2610/14* (2013.01); *F01N 2610/1486* (2013.01); *H05B 2203/014* (2013.01); *H05B 2214/02* (2013.01); *Y02A 50/2325* (2018.01); *Y02T 10/24* (2013.01)

(56) References Cited

U.S. PATENT DOCUMENTS

| | | | | |
|---|---|---|---|---|
| 2010/0193530 A1* | 8/2010 | Leonard | ............... | F01N 3/2066 220/694 |
| 2010/0253067 A1* | 10/2010 | Isenburg | ............... | F16L 21/06 285/41 |
| 2010/0263740 A1* | 10/2010 | Borgmeier | ............. | F16L 25/01 137/341 |
| 2010/0290764 A1* | 11/2010 | Borgmeier | ............. | F16L 25/01 392/468 |
| 2011/0025043 A1* | 2/2011 | Gamier | ................ | F16L 53/005 285/41 |
| 2012/0100735 A1* | 4/2012 | Rosenfeldt | ............. | F16L 25/01 439/190 |
| 2012/0291881 A1* | 11/2012 | Eckardt | ................ | F16L 53/008 137/341 |
| 2012/0291904 A1* | 11/2012 | Eckardt | ................ | F16L 53/008 138/109 |
| 2014/0069621 A1* | 3/2014 | Mann | ........................ | F28F 1/00 165/178 |
| 2014/0290214 A1 | 10/2014 | Heichelbech et al. | | |
| 2014/0366974 A1* | 12/2014 | Etscheid | ................ | F16L 25/01 138/33 |
| 2015/0139632 A1* | 5/2015 | Mueller | ................ | F01M 13/00 392/480 |
| 2015/0369414 A1* | 12/2015 | Schwarzkopf | .......... | F24H 1/102 392/480 |
| 2017/0023163 A1* | 1/2017 | Ward | ................... | F16L 37/084 |
| 2017/0045173 A1* | 2/2017 | Wenzel | ................... | G01L 19/06 |

FOREIGN PATENT DOCUMENTS

EP      1777452 A2    4/2007
WO   WO 2013/053478 A1    4/2013

* cited by examiner

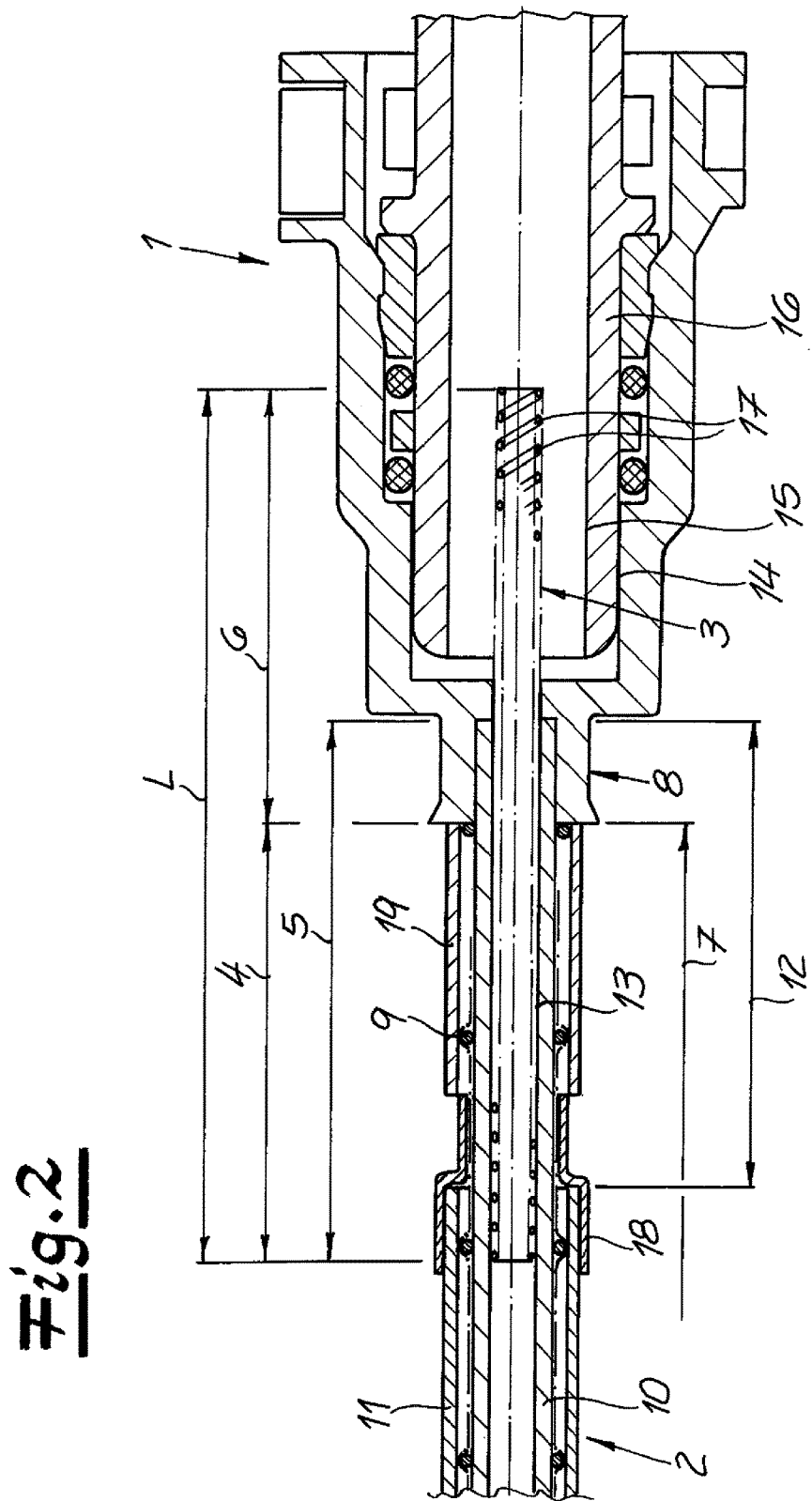

CONNECTOR ASSEMBLY WITH AT LEAST ONE CONNECTOR AND AT LEAST ONE MEDIA LINE

CROSS REFERENCE TO RELATED APPLICATIONS

The present patent document claims the benefit of and priority to European Patent Application No. EP 16157018.9, filed Feb. 23, 2016, the entire contents of which are incorporated herein by reference.

FIELD

The present disclosure relates to a connector assembly, in particular a motor-vehicle connector assembly with at least one connector—preferably with at least one quick connector—and with media line connected to the connector, wherein the media line is heated, in particular electrically heated and preferably electrically heated by means of at least one heating means running alongside the media line.

BACKGROUND

Connector assemblies of the type named above are known in various embodiments from the prior art. Heating, and/or electrically heating such connector assemblies and their components is also known. Heating of this type is useful and/or necessary, particularly when fluid media in the form of aqueous media is passed through the assembly. Urea solutions are used particularly in the context of SCR catalyst systems, in particular for diesel engines. They tend to freeze at low temperatures, which can reduce or degrade the functional capacity of the catalyst system. Heating the connector assembly and/or the connector and/or the media line for the aqueous urea solutions should remedy this. With the connector assemblies known from the prior art, heating is often expensive and complicated. In many of these assemblies, both the connector and the media line are heated using separate heating means, and that requires elaborate channeling, attachment and wiring of the heating means. Many known connector assemblies also do not meet all requirements for adequate and reliable heating. In this respect, the known connector assemblies could be improved or are in need of improvement.

SUMMARY

The invention is based on the technical problem of designing a connector assembly of the type mentioned above, in which simple and less elaborate, but nevertheless reliable heating is possible, and in which the disadvantages described above can be avoided.

In the context of the present disclosure, a connector assembly is provided for a fluid medium of a motor vehicle, and/or the fluid medium of a motor vehicle passes through it. This fluid medium is, in particular, an aqueous urea solution. Furthermore, in the context of the present disclosure, the liquid medium passes through both the connector and the media line of the connector assembly. Advantageously, an additional media line, and/or a pipeline and/or a unit, for example a tank or the like is connected to the connector of the connector assembly. The connector used in the context of the present disclosure is preferably a quick connector which is connected to a pipeline, and/or to an additional media line and/or to a unit on at least one connecting end by means of a releasable locking connection.

In order to resolve this technical problem, the present disclosure provides a connector assembly and/or a motor-vehicle connector assembly with at least one connector—in particular with at least one quick connector—and with at least one media line connected to the connector, wherein the media line can be heated, in particular electrically heated—preferably electrically heated by means of at least one heating means running alongside the media line—wherein at least one heating element is arranged in the transitional area between the connector and the media line, wherein the heating element extends with a first heat-conducting section into the media line and extends with a second heat-conducting section into the connector, and wherein by means of the electric heating of the media line, the heat-conducting element is heated and/or indirectly heated, and is in particular heated and/or indirectly heated as far as the region of the connector. A particularly recommended embodiment of the invention is thus characterized by at least 15%, preferably at least 20% and most preferably at least 25% of the length of the heat-conducting element extending into an electrically heated line-section of the media line. Advantageously, at least 30% and preferably at least 35% of the length of the heat-conducting element extends into an electrically heated section of the media line.

The present disclosure is based on the finding that with the inventive connector assembly, only an active and/or electrical heating of the media line is required, and that nonetheless, by means of this inventive heat-conducting element of the connector, the connector can be reliably and effectively heated, and/or additionally heated. The heat-conducting element is, as it were, indirectly heated due to the electrical heating of the media line. Preferably no direct contact is provided between the heating means for the electrical heating of the media line and the heating element. It is recommended that the heating means be separated from the heat-conducting element by the wall, and/or by a wall of the media line. This wall of the media line is advantageously made of plastic, and/or mostly of plastic. In the context of the present disclosure, the connector is heated as well, solely due to the heating of the media line, and no additional active heating of the connector takes place.

The inventive connector assembly is intended particularly for the passage of a fluid medium in a motor vehicle, with the fluid medium passing through both the connector and the media line attached to it. The fluid medium is preferably a urea solution and/or an aqueous urea solution. According to a preferred embodiment of the invention, the media line consists of plastic and/or mostly of plastic, and/or the connector consists of plastic and/or mostly of plastic. According to one embodiment of the present disclosure, the plastic comprises a thermally conductive plastic. The heating element consists at least partially—and preferably mostly—and as recommended herein, completely, of a metallic material, for example steel, copper or the like.

The connector of the inventive connector assembly is preferably designed as a quick connector. This quick connector has on at least one connection end—preferably only on one connection end—a snap-in connection for the latching connection of a media line, and/or a pipeline and/or a unit, for example a tank or the like. In the context of the invention, with the inventive connector assembly, the media line, and/or the heated media line, engages with the connector—in particular with a connecting piece of the connector. It is recommended that the heated media line be non-detachably connected to the assigned connection end of the connector. Advantageously, on an additional and/or on the other connection end of the connector, a snap-in connection of a quick connector is provided. According to one variant of the embodiment, the heated media line is integrally connected to the connection-end of the connector, in particular is welded and/or glued. In principle, other types of connections are conceivable, for example a screw connection or the like. According to a preferred embodiment of the present disclosure, the media line is electrically heated by means of an electric heating means and/or by a heating element. As an electric heating element, a heating wire in particular, or a heating foil can be used. According to a variant of an embodiment of the present disclosure, the heating element and/or the hearing wire is positioned alongside the media line, in particular parallel to the media line. One embodiment of the present disclosure is characterized in that the media line is electrically heated by means of a heating element that is wound around the media line, in particular by means of at least one heating wire that is wound around the media line. Advantageously, the at least one heating wire is arranged as helically wound around the media line. According to one variant of the embodiment, in the electrically-heated line section of the media line into which the heat-conducting element extends, a winding of the heating wire is provided, at least in regions, which is tighter than in the other regions of the media line. Here, tighter winding of the heating wire means, in particular, that the spacing between the windings is smaller than in the other regions of the media line.

Another embodiment of the present disclosure is characterized by the media line having an inner tube and at least one jacket-tube surrounding the inner tube, at least in regions. Advantageously the jacket tube extends along the greater portion of the length of the media line and/or the inner tube, and thereby surrounds the inner tube along the entire circumference of the inner tube. According to one variant of the embodiment of the present disclosure, the jacket-tube is formed as a corrugated tube. However in principle, other jacket-tube variants can also be used. It is recommended that the at least one heating wire be arranged between the inner tube and the jacket-tube surrounding the inner tube. Here it is recommended that the at least one heating means or heating element or the at least one heating wire is wound around the inner tube, and is preferably helically wound. Alternatively or additionally, the heating means, and/or heating element, and preferably the heating wire, also extends alongside the inner tube, in particular parallel to the inner tube.

Another embodiment of the present disclosure is thus characterized in that the media line and/or the inner tube of the media line, has an end section without jacket-tube, and that this jacket-tube-free end section is preferably connected to the connector and advantageously engages with the connector. In the context of the present disclosure, the end section of the media line is electrically heated, at least in regions, and with the at least one heating means or heating element, or the at least one heating wire being wound around the end section, and advantageously helically wound around the end section. According to one embodiment of the present disclosure, the windings of the heating element and/or the heating wire are narrower on the end section than in the rest of the region, or as they are in the region of the media line surrounded by the jacket-tube. The windings and/or the helical windings then have smaller distances between them on the end section than in the other regions of the media line, or as is the case in the region of the media line that is surrounded by a jacket-tube.

Another embodiment of the present disclosure is characterized in that at least one fixing element for fixation of the at least one heating means or heating element, or for fixation of the at least one heating wire is arranged or secured on the end section of the media line. Advantageously, the fixing element then covers the heating means and/or the heating element that is arranged on or wound around the end section (of the inner tube). According to one variant of an embodiment, a heat-shrink tubing section is used as a fixing element. This heat-shrink tubing and/or heat-shrink tubing section is preferably used in the transition region of the inner tube that is covered by the jacket-tube and the jacket-tube free end-section of the inner tube, the heat-shrink tubing section then being shrink-fit in regions onto the jacket tube and shrink-fit in regions onto the end section that is provided with the at least one heating element. The heat-shrink tubing and/or the shrink-fit tubing section thus also provides, in particular, a sealing function and serves, for example, to seal against water. According to one embodiment of the present disclosure, a cylindrical protective sleeve is used as a fixing element that covers the at least one heating means and/or the at least one heating element that is applied to the end section. A preferred embodiment is characterized, as explained above, by a heat-shrink tubing section being used as a fixing element, and/or a sealing element in the transition region between the inner tube that is covered by the jacket-tube and the jacket-tube free end section, and that in the region of the end-section adjacent to the heat-shrink tubing section, a protective sleeve that surrounds the end section is used as a fixation element. Advantageously, the protective sleeve covers and/or largely covers the remaining region of the end section between shrink-fit tube section and connector. It is recommended that an outer protective sleeve intended preferably for the connector covers both the connector and also—at least in regions—the end section of the media line. The outer protective sleeve of the connector preferably covers the at least one fixing element that is arranged on the end section for the fixation of the at least one heating element. According to another embodiment, both a heat-shrink tube section applied to the end section and the protective sleeve that is applied to the end section will be covered by the outer protective sleeve of the connector. According to another embodiment, the outer protective sleeve of the connector can be formed by an outer housing that is advantageously assembled from a plurality of housing sections, in particular from two housing halves. According to another embodiment of the present disclosure, the outer protective sleeve of the connector is realized by overmolding with a thermoplastic. However, the outer protective sleeve of the connector can also be obtained by using a heat-shrinkable tube, by winding with suitable wrapping material and/or by casting using a thermosetting plastic.

In the context of the present disclosure the heating element is indirectly heated and preferably only indirectly heated. Advantageously, there is no direct heating and in particular no direct electrical heating of the heat-conducting element. Also in the context of the invention, the first heat-conducting section of the heat-conducting element engages with the end section and/or the electrically-heated end section of the media line. In principle the heat-conducting element can also extend beyond the end section into the media line and thus extends into a section of the media line that is surrounded by a jacket tube. It is recommended that at least 50%, preferably at least 60%, as recommended herein at least 70%, more preferably at least 75%, and even more preferably at least 80%, and most preferably at least 85% of the length of the first heat-conducting section of the heat-conducting element that extends into the media line be arranged on the end section.

Another embodiment of the present disclosure is characterized in that the heat-conducting element and/or the first heat-conducting section of the heat-conducting element abuts at least in regions on the inner wall of the end section of the media line. In the context of the invention, the heat-conducting element, and/or the first heat-conducting section, abuts along the entire circumference against the inner wall of the media line or the end section thereof. The heat-conducting element and/or the first heat-conducting section of the heat-conducting element preferably abuts in a clamping manner, and/or in a clamping position against the inner wall of the media line, and/or against the inner wall of the end section.

Another embodiment of the present disclosure is characterized in that the second heat-conducting section of the heat-conducting element, which extends into the connector, is arranged, at least in regions as having a gap between it and the inner wall of the connector and/or as having a gap between it and the inner wall of a pipeline that is connected to and/or inserted into the connector. Here it is recommended that the greater portion of the length, and preferably at least 70%, more preferably at least 75%, and even more preferably at least 80% of the length of the second heat-conducting section of the heating element that extends into the connector be arranged with a gap between it and the inner wall of the connector and/or with a gap between it and the inner wall of the pipeline that is inserted into the connector. Here, in the context of the present disclosure, the heat-conducting element and/or the second heat-conducting section is arranged along the entire circumference as having a gap between it and the inner wall of the connector, and/or between it and the connected/inserted pipeline.

According to yet another embodiment of the present disclosure, at least 20%, preferably at least 25%, and more preferably 30% of the length of the heat-conducting element extends into the connector. This proportional longitudinal region then corresponds to the length of the second heat-conducting section of the heat-conducting element. Also in the context of the present disclosure, the connector, aside from the warming and/or heating due to the heat-conducting element, is designed as unheated, in particular as not having electrical heating. In this way, complicated additional heating of the connector is advantageously avoided.

According to another embodiment of the present disclosure, the heat-conducting element extends linearly and/or substantially linearly in the transition region between connector and media line. Advantageously at least 50%, as recommended 60%, preferably at least 75%, more preferably at least 80%, even more preferably at least 85%, and most preferably at least 90% of the length L of the heat-conducting element is designed as linear and/or rectilinear. In the context of the present disclosure, the heat-conducting element, along the major part of its length L and preferably along its entire length, has a round and/or circular cross-section. The heat-conducting element is preferably designed as cylindrical and/or as having a cylindrical contour along the majority of its length L and preferably along its entire length L.

A preferred embodiment, which has very particular significance in the context of the present disclosure, is characterized in that the heat-conducting element, at least along a portion of its length L, preferably along the majority of its length L, and preferably along its entire length L, is designed as a coil spring. The term coil spring also includes tension springs and compression springs and possibly other embodiments. According to the previously mentioned recommended embodiment, the coil spring extends linearly and/or substantially linearly into the transition region between connector and media line. However, in a curved-line and/or curved media-line section, the coil spring can also be designed as arcuate or curved. The coil spring is preferably cylindrical or at least cylinder-shaped in some sections. According to another embodiment, the coil spring has a constant diameter and/or a constant cylinder diameter (constant diameter of the cylinder contour), at least along the majority of its length L and as recommended herein, along its entire length L. However, according to another variant of the embodiment, different diameters and/or cylinder diameters of the at least one coil spring can be implemented. Thus, in the context of the invention, the diameter and/or the cylinder diameter of the coil spring in the connector is different than the diameter of the coil spring in the media line and/or in the end-section of the media line.

It has proven expedient to have the windings and/or the coils of the coil spring spaced apart at constant distances and/or spaced apart at substantially constant distances along part of the length L, preferably along the greater part of the length L of the coil spring. According to an embodiment of the present disclosure, the coil spring consists of a continuously wound spring wire. Here, the spring wire preferably has a thickness and/or a diameter of 0.3 to 2 mm, preferably from 0.3 to 1.5 mm, and particularly preferably from 0.4 to 1 mm. Advantageously the coil spring is made of metal and/or substantially of metal, and preferably of steel or copper or a copper alloy. The coil spring can also be made of a thermally conductive plastic. In the context of the invention, the windings and/or the coils of the coil spring surround the inner channel though which the fluid medium flows. Advantageously the windings and/or the coils of the coil spring abut along the greater part of the length of this section of the coil spring and preferably along the entire length of this section of the coil spring against the inner wall of the media line and/or against the internal tube, and preferably in a clamping manner and/or in a clamping position. This can then guarantee reliable holding of the heat-conducting element and/or of the coil spring. Furthermore, the heat-conducting element in the form of the preferred coil spring can be inserted simply and with little force into the media line and/or into the internal tube of the media line, and for example can be simply inserted and/or screwed therein. The design of the heat-conducting element as a coil spring has proven particularly expedient in the context of the invention.

According to another embodiment of the present disclosure, the heat-conducting element is formed as a solid profile rod. It is recommended that this solid profile rod consist of metal or substantially of metal, for example steel or copper or a copper alloy. If the heat-conducting element in the form of the solid profile rod abuts on the inner wall of the media line and/or the internal tube, this abutment advantageously does not occur around the entire circumference of the solid profile rod. According to another embodiment there is then, in these abutment regions between the solid profile rod and the inner wall, at least one flow-through passage, and preferably a plurality of flow-through passages are provided for the passage of the fluid medium. In principle, in the context of the present disclosure, the heat-conducting element can also take other forms, for example the form of an internally hollow cylindrical heat-conducting sleeve. However, particularly preferable in the context of the invention is the design of the heat-conducting element as a coil spring.

The present disclosure is based on the finding that with the inventive connector assembly and/or motor-vehicle connector assembly, a simple and less complicated and at the same time optimal heating of both the media line and the connector is possible. In principle, for this purpose, in the context of the present disclosure the heating and/or electrical heating of the connector by means of the inventive heat-conducting element is sufficient. The heat-conducting element can be placed and/or installed in a simple and precise manner in the transition region between the media line and the connector. This applies especially to the particularly preferred embodiment of the design of the heat-conducting element as a coil spring. The heating of the unit comprised of media line and connector has long-term reliability and can be efficiently realized. It should be stressed that the present disclosure can be realized with little effort and at low cost. With the present disclosure, complicated supplementary heating of the connector is in principle not necessary.

BRIEF DESCRIPTION OF THE DRAWINGS

The present disclosure will be explained in detail below using a drawing that depicts only one design example. The following is shown in schematic form.

DETAILED DESCRIPTION

Figure 1:
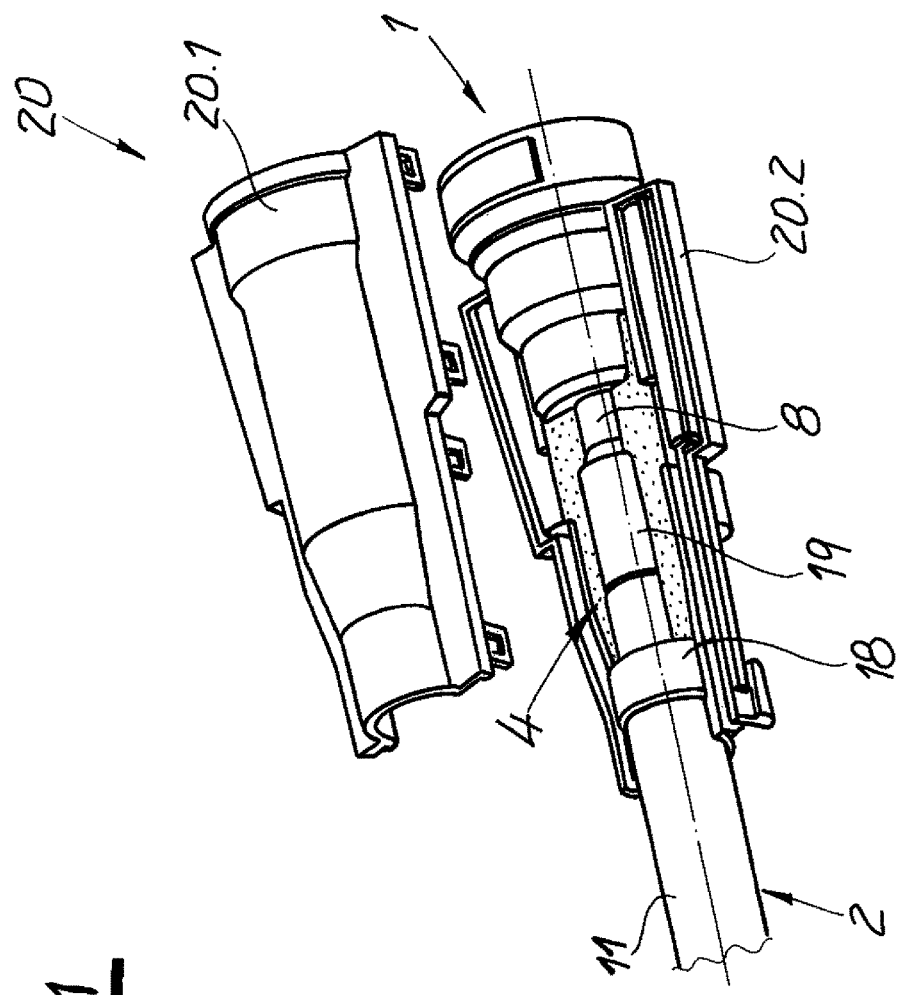
FIG. 1 a cross-section through an inventive connector assembly comprising a quick connector and a media line connected to it, and FIG. 2 a perspective, exploded view of the object according to FIG. 1.

The figures show an inventive connector assembly that preferably, and as in the design example, takes the form of a motor-vehicle connector assembly comprised of a connector 1 in the form of a quick connector and a media line 2 that is attached to it. The connector assembly serves particularly to enable the transmission of a fluid medium of a motor vehicle, to be precise an aqueous urea solution for the catalyst system of a motor vehicle. According to the preferred embodiment and in the design example, the media line 2 is electrically heated, to be precise with the help of a heating wire 9 that is helically wound around the internal tube 10 of the media line 2.

An inventive heat-conducting element is arranged in the transition region 4 between the connector 1 and the media line 2. This heat-conducting element 3 extends with a first heat-conducting section 5 into the media line 2, and with a second heat-conducting section 6 into the connector 1. In so doing, the first heat-conducting section 5 extends—preferably, and as in the design example—with the heating wire 9 into the electrically heated line section 7 of the media line 2. Advantageously, and as in the design example, the media line 2 engages the connector 1, thus, and as in the design example engaging a connecting piece 8, among other things, of the connector 1.

Preferably, and as in the design example, the media line 2 has an internal tube 10 and a jacket-tube 11 that surrounds the internal tube 10 along at least the greater part of its length. Here the heating wire 9 is arranged between the internal tube 10 and the jacket-tube 11 and is wound around the internal tube 10. Preferably, and as in the design example, the media line 2 and/or the internal tube 10 of the media line is provided with a jacket-tube free end section 2 connected to the connector. In this way, the end section 12 is heated by the heating wire 9, and to be specific, preferably, and as in the design example essentially along its entire length and/or along the majority of its length. As recommended, and as in the design example, the first heat-conducting section 5 of the heat-conducting element 3 passes right through the end section 12 of the media line 2.

According to the preferred embodiment, and as in the design example, the first heat-conducting section 5 of the heat-conducting element 3 which extends into the internal tube 10 of the media line 2, abuts along its entire circumference on the inner wall 13 of the internal tube 10, and/or on the end section 12 of the medial line 2. According to a particularly preferred embodiment, and as in the design example, then heat-conducting element 3 is designed as a coil spring. The heat-conducting element 3, formed as a spring coil, advantageously, and as in the design example, abuts with the first heat-conducting section 5 in a clamping manner and/or in a clamping position on the inner wall 13 of the internal tube 10 and/or on the end section 12. As recommended, and as in the design example according to the figures, the coil spring has the same cylinder circumference along its entire length L. In addition, preferably, and as in the design example, there is the same spacing between the windings 17 of the coil spring along the length L of the coil spring.

The inventive heat-conducting element 3 and/or the coil spring preferred in the context of the invention, extends with a second heat-conducting section 6 into the connector 1. Here, preferably, and as in the design example of this second heat-conducting section 6, the coil spring is arranged along the greater part of its length as having a gap between it and the inner wall 14 of the connector 1 and as having a gap between it and the inner wall 15 of a pipeline 16 inserted into the connector 1. In the context of the present disclosure, the connector 1 is warmed and/or heated by means of the second heat-conducting section 6 that extends into the connector 1. Here, as recommended and as in the design example—except for this warming and/or heating by means of the heat-conducting element 3—no other heating, in particular no electrical heating of the connector 1 is provided.

In FIG. 2 it is evident that preferably, and as in the design example, two fixing elements are provided for mounting the heating wire 9 on the end section 12 of the media line 2. A fixing element is designed in the form of a heat-shrink tubing section 18 that is provided in the transition region between the jacket tube 11 and the end section 12 and which covers both the end of the jacket-tube 11 and the beginning of the end section 12. In the design example according to FIG. 2, after the heat-shrink tubing section 18 an additional fixing element in the form of a cylindrical protective sleeve 19 is mounted on the end section 12, which protective sleeve also covers and/or protects the heating wire 9. As recommended, and as in the design example, the connector 1 and the end section of the media line 2 are surrounded by an outer shell in the form of a housing 20. In this manner, this housing provided for the connector 1 also covers the end of the media line 2 and/or the end section 12 of the media line 2. Preferably, and as in the design example, the housing 20 also covers both the heat-shrink tubing section 18 and the cylindrical protective sleeve 19. The housing 20 is preferably, and as in the design example, designed in the form of two housing halves 20.1 and 20.2.

It can also be seen in the figures that the inventive heat-conducting element 3—in the design example in the form of a coil spring—has a linear design. In the design example, the first heat-conducting section 5 of the heat-conducting element 3 extends both through the end section 12 of the media line 2 and into a short section of the media line 2 that is adjacent to the end section and is surrounded by the jacket tube 11.

The invention claimed is:

1. A connector assembly, with at least one connector comprising a quick connector, and with at least one media line that is connected to the connector, wherein the media line is electrically heated by at least one heating means that runs alongside the media line, wherein at least one heat-conducting element is arranged in a transition region between the connector and the media line, wherein the heat-conducting element extends with a first heat-conducting section into the media line and with a second heat-conducting section into the connector, and wherein the electric heating of the media line causes the heat-conducting element to be heated as far as a region of the connector, wherein the first heat-conducting section contacts an innermost surface of the media line, so that the first heat-conducting section comes into contact with a fluid medium when the fluid medium is applied to the connector assembly.

2. The connector assembly according to claim 1, wherein at least 15% of the length of the heat-conducting element extends into an electrically heated line section of the media line.

3. The connector assembly according to claim 1, wherein the media line engages the connector and is integrally connected to the connector.

4. The connector assembly according to claim 1, wherein the media line can be electrically heated by at least one heating wire that is wound around the media line.

5. The connector assembly according to claim 4, wherein the media line has an internal tube and at least one jacket-tube that surrounds the internal tube at least in regions, and wherein the at least one heating wire is arranged between internal tube and jacket-tube and is wound around the internal tube.

6. The connector assembly according to claim 5, wherein at least one of the media line and the internal tube of the media line has a jacket-tube free end section connected to the connector, wherein the end section is electrically heated, at least in regions, and wherein at least one fixing element for fixing at least one heating wire is arranged and/or mounted on the end section.

7. The connector assembly according to claim 6, wherein the heat-conducting element engages at least one of the first heat-conducting section in the end-section and the electrically heated end-section of the media line.

8. The connector assembly according to claim 1, wherein the heat-conducting element is only indirectly heated, and no direct heating of the heat-conducting element takes place.

9. The connector assembly according to claim 1, wherein at least one of the heat-conducting element and the first heat-conducting section of the heat-conducting element, abuts on the inner wall of the media line on the inner wall of the end section of the media line.

10. The connector assembly according to claim 9, wherein the heat-conducting element abuts at least in regions on the end section of the media line and abuts substantially along an entire circumference of the heat-conducting element, on the inner wall of the end section of the media line.

11. The connector assembly according to claim 1, wherein the heat-conducting element is arranged, at least in regions, with a gap between the heat-conducting element and the inner wall of the connector.

12. The connector assembly according to claim 1, wherein the heat-conducting element is arranged, at least in regions, with a gap between the heat-conducting element and an inner wall of a pipeline that is inserted into the connector.

13. The connector assembly according to claim 1, wherein at least 20% of the length of the heat-conducting element extends into the connector.

14. The connector assembly according to claim 1, wherein the connector, except for the heating by the heat-conducting element, is designed without electrical heating.

15. The connector assembly according to claim 1, wherein the heat-conducting element is structured to be essentially linear.

16. The connector assembly according to claim 1, wherein the heat-conducting element is formed as a coil spring along at least a part of a length (L) of the heat-conducting element.

17. The connector assembly according to claim 1, wherein the heat-conducting element is formed as a solid profile rod along at least one part of a length (L) of the heat-conducting element.

18. The connector assembly according to claim 1, wherein the connector has an outer protective sleeve, and whereby the outer protective sleeve covers both the connector and, at least in sections, the end-section of the media line, and wherein the outer protective sleeve is designed as a housing comprised of at least one of a plurality of housing sections and overmolding with a plastic.

* * * * *